United States Patent [19]
Lahti

[11] Patent Number: 4,723,614
[45] Date of Patent: Feb. 9, 1988

[54] APPARATUS FOR AUTOMATICALLY DISPENSING WEIGHT-CONTROLLED PORTIONS OF GRANULAR FOODSTUFF

[75] Inventor: Arne Lahti, Vaasa, Finland

[73] Assignee: Oy Maxi-Tuotanto AB, Vassa, Finland

[21] Appl. No.: 877,987

[22] Filed: Jun. 24, 1986

[51] Int. Cl.⁴ .................. G01G 13/02; G01G 3/14; G01G 19/00; G01F 11/20
[52] U.S. Cl. .................. 177/120; 177/210 C; 177/245; 222/413
[58] Field of Search ........... 177/122, 128, 119–121, 177/245, 210 C; 222/288, 413

[56] References Cited

U.S. PATENT DOCUMENTS

| | | | |
|---|---|---|---|
| 3,173,506 | 3/1965 | Clamp | 177/120 X |
| 4,275,808 | 6/1981 | Bullivant et al. | 222/413 X |
| 4,458,770 | 7/1984 | Bucci | 177/210 C |
| 4,629,019 | 12/1986 | Harrington et al. | 177/210 C |

FOREIGN PATENT DOCUMENTS

| | | | |
|---|---|---|---|
| 484348 | 10/1929 | Fed. Rep. of Germany | 177/120 |
| 520022 | 3/1931 | Fed. Rep. of Germany | 177/122 |
| 570899 | 2/1933 | Fed. Rep. of Germany | 177/120 |

Primary Examiner—George H. Miller, Jr.
Attorney, Agent, or Firm—Guy W. Shoup

[57] ABSTRACT

A modular apparatus for dispensing weight-controlled foodstuff portions includes a housing which supports a removable silo, feeder screw, and blocking plate components which discharge the foodstuff to a dosage cup. A capacitor transducer is employed to support the dosage cup and perform a weighing function. The housing has an opening for receiving foodstuff from the silo which leads to a feeder pathway. The removable feeder screw advances the food to the blocking plate which through a vibratory motion effects discharge to the dosage cup. An electronic control card inputs a weighing signal from the transducer for controlled operation of the apparatus.

11 Claims, 10 Drawing Figures

APPARATUS FOR AUTOMATICALLY DISPENSING WEIGHT-CONTROLLED PORTIONS OF GRANULAR FOODSTUFF

TECHNICAL FIELD

The present invention relates to an apparatus for dispensing weight-controlled portions of granular materials, such as finely chopped foodstuff, which is compact in design and has application in the food and restaurant service industries. More particularly, the invention is concerned with an automatic food dispensing apparatus of modular design which may be readily assembled and disassembled to obtain economies in maintenance and manufacture.

In the food and restaurant service industries dispensing apparatus have found wide application in the preparation of foods including processed and packaged foods, in which ingredient weight control is necessary to achieve standardization and products of uniform quality. For example, such apparatus have application in pizzerias in the dispensing of weight-controlled portions of granular foods, such as grated cheese, for preparation of pizza and other cuisine. Heretofore, the prior art has provided apparatus which employ silo-container structures for storing foodstuff, feeder devices for dispensing foodstuff, and self-contained weighing devices which through electronic circuitry provide weighted portions of foodstuff. As representative of the state of the art, reference may be had to U.S. Pat. Nos. 499,223 and 3,557,888.

However, in general, there has not been available a food dispensing apparatus of modular and compact design. It will be appreciated that a modular design would offer manufacturing advantages and efficiencies in maintenance and operation to the user. A modular food dispensing apparatus would facilitate cleaning on a frequent basis and avoid spoilage or tainting of foodstuff during processing by reason of improper maintenance. Compactness in design would also provide advantages in restaurant establishments by providing additional space in food preparation areas. These are needs in the food and restaurant industries which have not been adequately met by the prior art.

Typical of the prior art are apparatus of the type shown in U.S. Pat. No. 3,557,888 which employs a conveyor screw driven by an electric drive to advance product through a feed opening to a weighing receptacle which is mounted on a scale. An endless conveyor belt extending outwardly from the receptacle discharges foodstuff to a container through a discharge door, see FIG. 1. Absent from this reference are modular features which facilitate maintenance of the apparatus.

Another representative prior art device is shown in European Patent No. 089, 835, which discloses a weighing apparatus which includes a supply station, a supply belt and feeder for conveying food to a weighing station, and then to a collecting hopper for discharge. The weighing station includes a number of feed chutes, pool hoppers and weighing hoppers, the weighing hoppers each have individual weighing mechanisms for measuring the weight of articles introduced into corresponding hoppers. The elaborate weighing and discharge features of this apparatus present inefficiencies in maintenance.

The present invention is directed to a modular apparatus for dispensing foodstuff in weighted portions which overcomes limitations of the prior art. In the apparatus, further advantage is obtained by incorporating a cooling system which maintains the freshness of foodstuff prior to weighing and discharge from the apparatus. It will be recognized that such a feature lengthens the time period during which foodstuff may be maintained in the apparatus between cleanings for further efficiencies and economies in operation.

Accordingly, it is a broad object of the present invention to provide an improved apparatus for automatically dispensing weight-controlled portions of granular foodstuff of compact design.

A more specific object of the present invention is to provide a modular apparatus for dispensing weight-controlled portions of foodstuff which is of less complex design than prior art apparatus for efficiencies in manufacture and maintenance.

A still further object of the invention is to provide a modular apparatus for dispensing weight controlled portions of foodstuff of compact design which incorporates a cooling system for maintenance of food freshness during weighing and dispensing operations.

DISCLOSURE OF THE INVENTION

In the present invention, these purposes, as well as others which will be apparent, are achieved generally by providing a modular apparatus which includes a housing having an opening for receiving granular foodstuff, a guide for directing foodstuff to a feeder pathway, a removable rotable feeding screw for advancing food through the feeder pathway to a discharge outlet, and a blocking plate means mounted in alignment with the housing outlet for controlling discharge of the foodstuff. The housing also encloses a transducer means for receiving foodstuff discharged by the feeding screw and blocking plate dispensing arrangement for performing a weighing function. The transducer means outputs an electronic weighing signal to an electronic control means which in turn actuates and controls operation of the feeder screw and blocking plate arrangement.

The feeder screw is removably mounted on a shaft in an opening provided in the screw. The blocking plate is removably mounted on a second reciprocating shaft through a blocking plate opening for vibratory motion. During operation, foodstuff is conveyed to the blocking plate by the feeder screw and discharged through a controlled vibrating motion. The foodstuff is collected in a dosage cup which rests on a weight sensitive holder which in turn is connected to the transducer means. Discharge of weight-controlled portions is regulated by the electronic control means which receives the weight signal from the transducer.

In a preferred embodiment of the invention, vibratory motion is imparted to the blocking plate by a pair of repetitively pulsed solenoids. In this preferred embodiment, the feeder screw shaft is fabricated of a conductive material, and the apparatus is further provided with a cooling means which cools the temperature of the feeder screw shaft and the foodstuff. The apparatus may also include a removable silo which is mounted in the housing opening for containing foodstuff prior to dispensing, and a rotable feeder arm assembly which effects uniform passage of foodstuff from the silo into the feeder pathway.

Modular features in the invention are provided by the blocking plate and feeder screw assemblies which are readily removed for cleansing, and the removable silo which provides unobstructed access to the foodstuff guide and feeder screw pathway.

Further objects, features and advantages of the invention will become apparent upon consideration of the following detailed description of preferred but nonetheless illustrative embodiments, when considered in conjunction with the following drawings, in which:

BEST MODE FOR CARRYING OUT THE INVENTION

Referring now to the drawings and, more particularly, to FIGS. 1–2 and 7–8 thereof, there is illustrated a modular apparatus for dispensing weight-controlled portions of granular foodstuff according to the present invention, generally designated 10. Although the apparatus has general application in the dispensing of weight-controlled portions of granular foodstuff, it is believed to have particular utility in restaurant service industries for dispensing weighted portions of granulated cheeses.

The modular apparatus 10 comprises a housing 20 which includes front, rear and side panels, 22, 24 and 26, a top end opening 28 for receiving granular foodstuff, a guide 30 for directing the foodstuff to a feeder pathway 32, and an outlet 34 for discharging the foodstuff.

The housing 20 supports numerous other components of the modular apparatus 10, including a silo 50, for containing the foodstuff, a feeder screw mechanism 80 for advancing the foodstuff through the feeder pathway 32, a blocking plate means for controlling discharge of the foodstuff, transducer means for performing a weighing function, and an electronic control means for actuating the feeder screw and blocking plate means to effect automatic dispensing of weight-controlled food portions.

Foodstuff is introduced into the apparatus and contained in the silo 50 which includes front, rear and side walls 52, 54, and 56, and is removably mounted in the open top end 28 of the housing 20 in a framing channel 36.

In the preferred embodiment of the invention, the silo 50 includes a transparent front panel section 53 which provides a gauge as to the level of foodstuff within the silo. The silo also includes a support member 58 which depends from the front silo panel 52 and extends into the housing to prevent foodstuff from bypassing the feeder screw 80 and discharging directly into outlet 34. The support member includes a semicircular opening 60 which aligns with the housing feeder pathway 32 and outlet opening 34.

Figures 3, 4B:
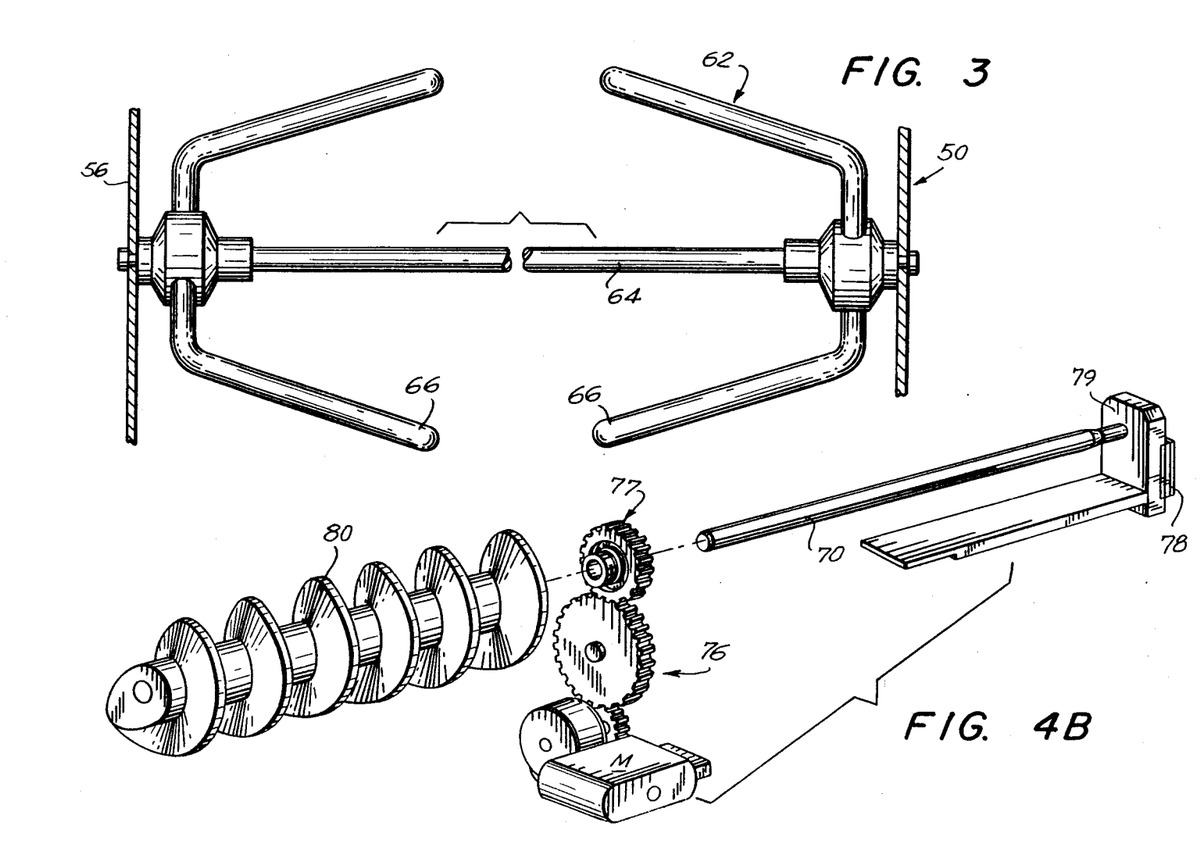
FIG. 3 is a cross-sectional view of a feeder arm structure of the apparatus taken substantially along the line 3—3 of FIG. 2.
FIG. 4B is a schematic illustration of the drive mechanism for the feeder screw.

A rotable feeder arm 62 is rotably mounted on sidewall 56 of the silo. The feeder arm, which is preferably fabricated of stainless steel, effects a uniform flow of granulated foodstuff from the silo to the feeder pathway 32. The feeder arm 62 includes a central shaft 64 and a plurality of outwardly angled and circumferentially offset arms 66. The feeder arm assembly 62 is powered by rotational movement of the feeder screw 80, as will be described below.

Figure 7:
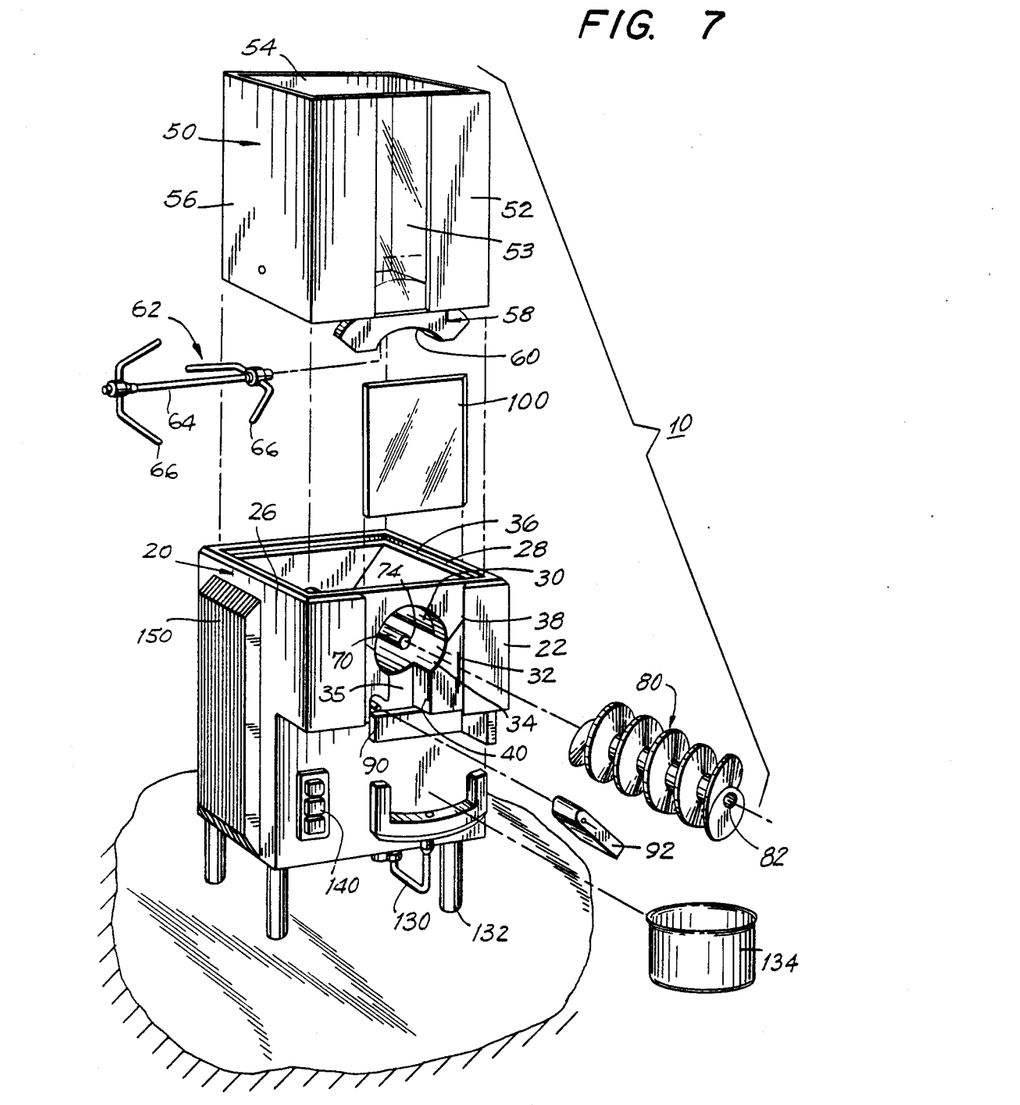
FIG. 7 is an exploded perspective view illustrating modular features of the apparatus, showing the manner in which its components are assembled and disassembled.

Within the housing 20, guide 30, best illustrated in FIG. 7, angles inwardly to convey foodstuff to feeder pathway 32 which has a generally semicircular configuration and extends from the rear of the housing to the front outlet opening 34. A fixed shaft 70, preferably fabricated of a heat conductive metal such as aluminum, is mounted within the feeder pathway 32. The shaft 70 includes a rear end which is bolted to a holding plate 79, and a front end 74 which extends to the vicinity of the housing outlet.

Figure 2:
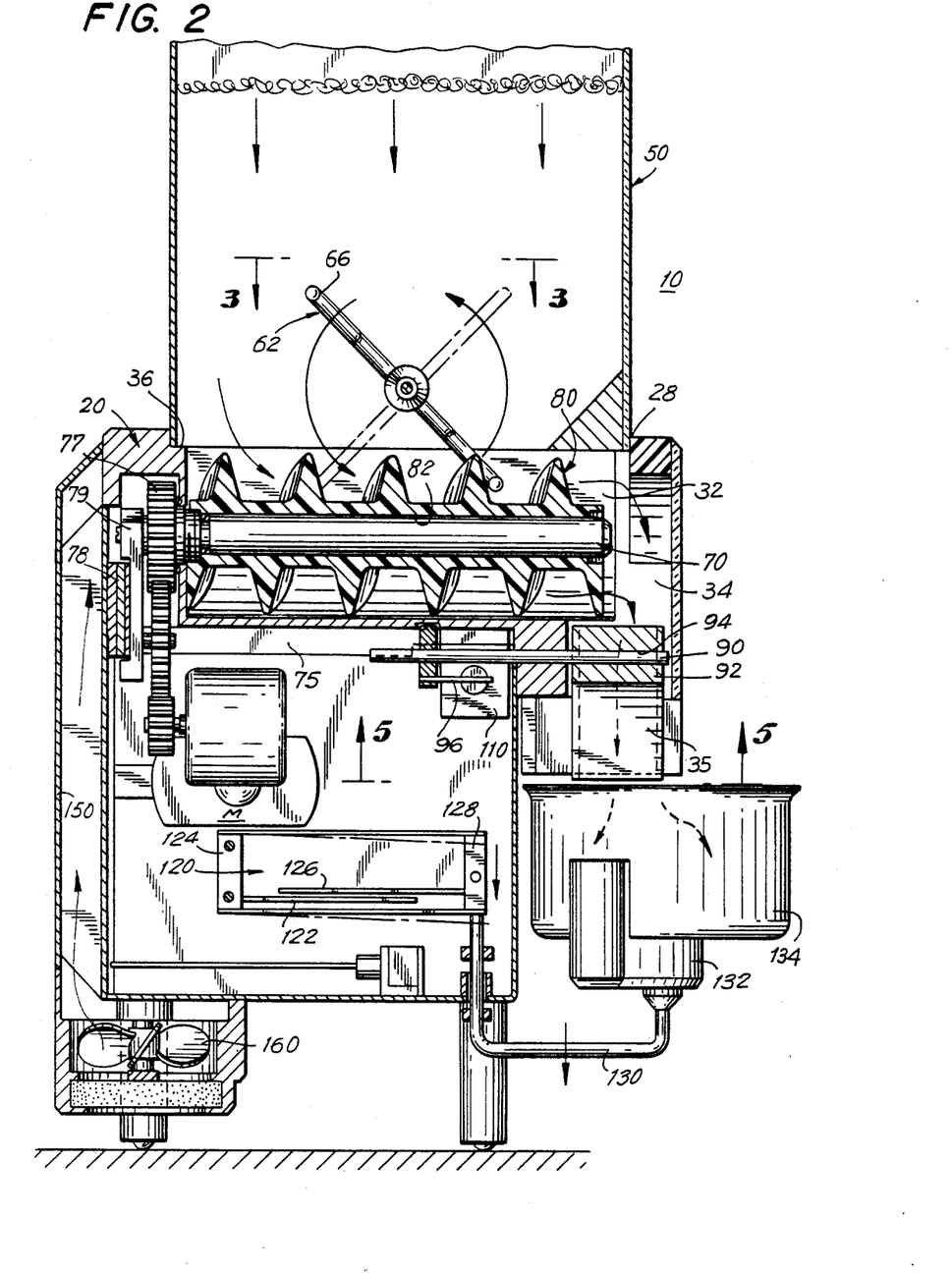
FIG. 2 is a cross-sectional view of the apparatus taken substantially along the line 2—2 of FIG. 1.

In order to provide a food cooling feature, the apparatus may include a cooling element 78 of the Peltier type, which is secured to the conductive shaft 70 by the holding plate 79. The cooling element 78 is fixed between a heat sink 150, to be described hereinafter, and the holding plate 79 by means of fixing screws (not shown). A cooling plate 75 disposed below the shaft 70, see FIG. 2, is fixed to the holding plate 79 by screws (not shown). Foodstuff contained in the apparatus is cooled by heat transfer from the fixed shaft 70 and the cooling plate 75 to the cooling element 78 and the heat sink 150. A suitable cooling element for use in the apparatus is marketed by Midland-Ross Corporation, Cambion Division, One Alewife Place, Cambridge, Mass. 02140 under their product designation 801-2005-01.

Figure 4A:
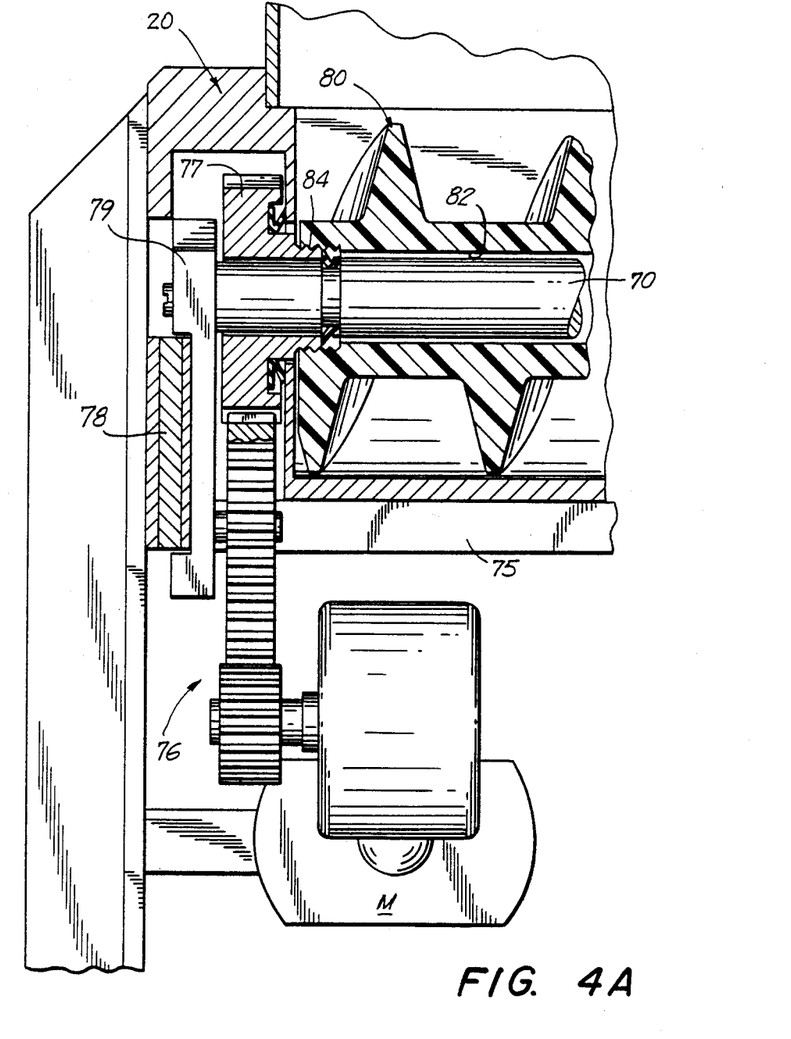
FIG. 4A is a cross-sectional view similar to FIG. 2 showing the feeder screw assembly.

The feeder screw 80 which has a generally helical outward configuration is slidably mounted on the shaft 70 through a first shaft opening 82 in its center. The feeder screw 80 includes a female threaded end 84 which screws into a male threaded driving gear wheel 77, best shown in FIGS. 4A, 4B, to facilitate its ready assembly and disassembly from the apparatus. Feeder screw 80 is driven by a conventional motor, designated "M" in FIG. 2, through a gear wheel assembly 76. In operation, foodstuff is conveyed through the feeder pathway 32 on rotating helixes of the feeder screw 80 to the outlet 34.

Figure 1:
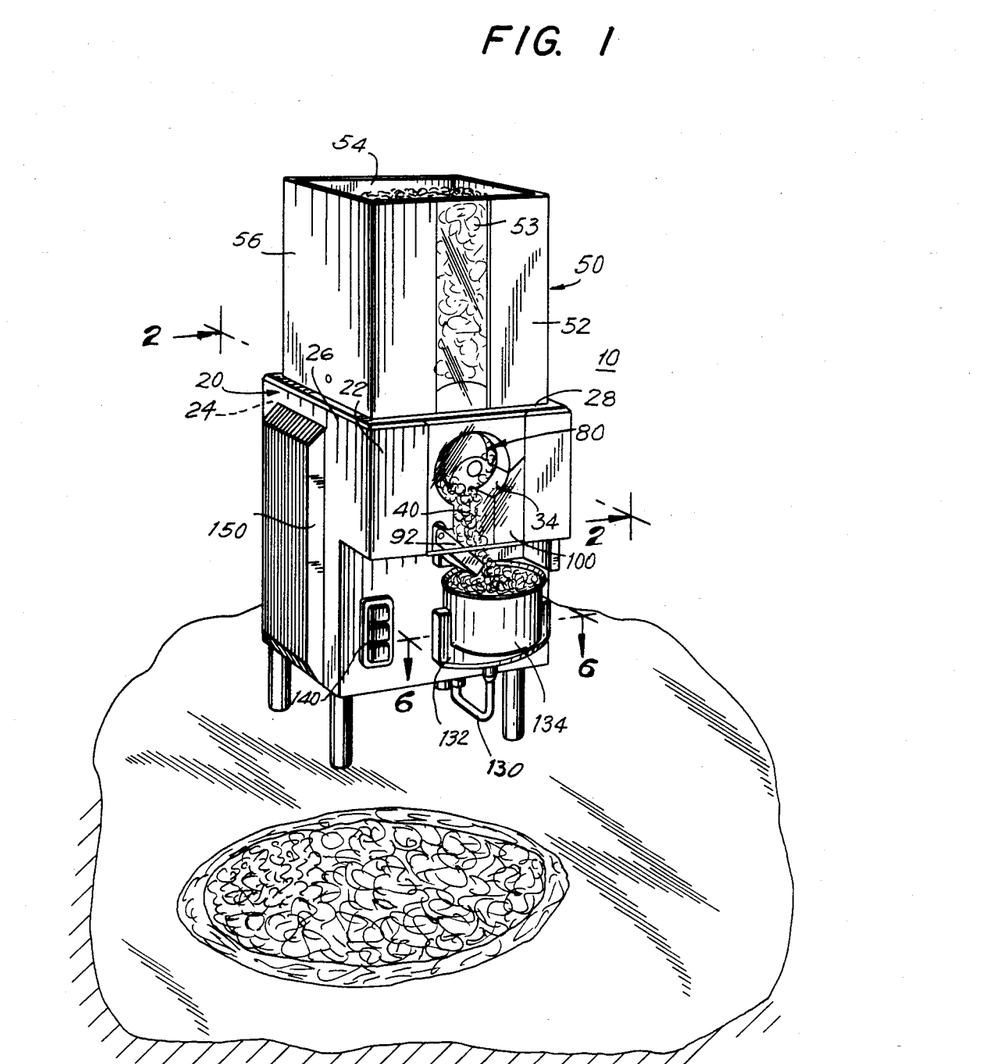
FIG. 1 is a perspective view of the modular apparatus for dispensing weight-controlled portions of foodstuff, showing such apparatus in operation, dispensing granular foodstuff.
Figure 8:
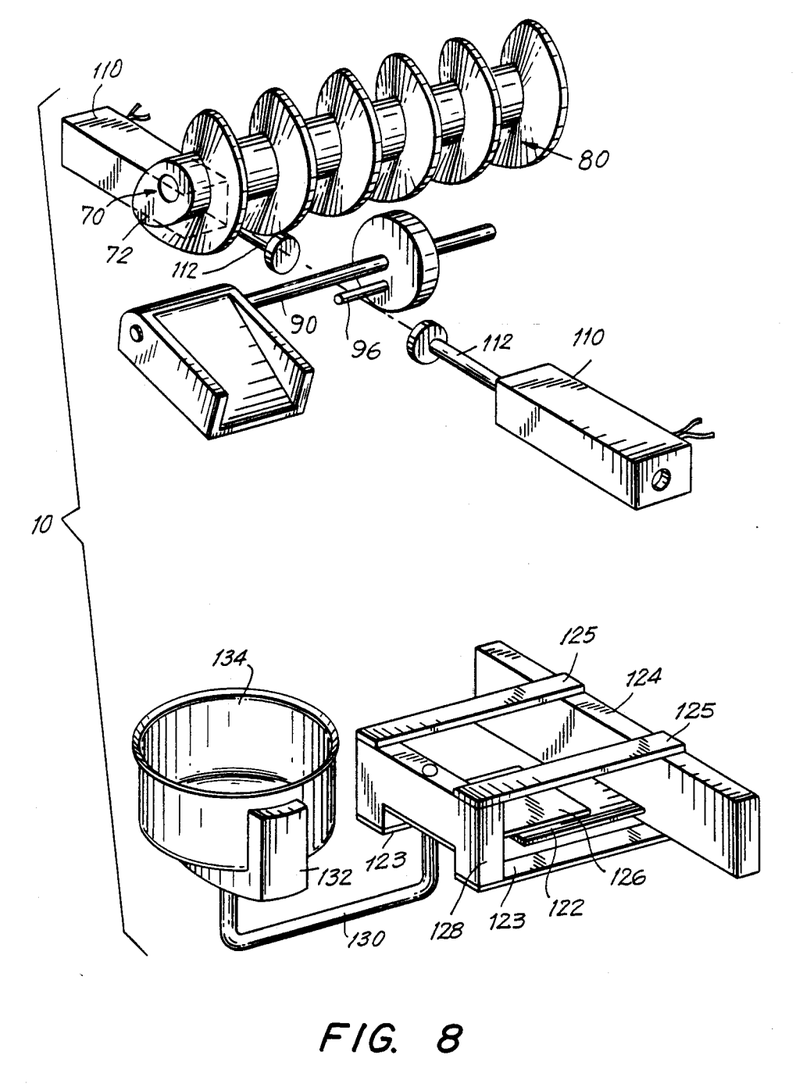
FIG. 8 illustrates the feeder screw and blocking plate assemblies and transducer means of the apparatus in isolation, schematically illustrating the interaction of these elements.

Mounted at the housing outlet is the blocking plate means, best shown in FIGS. 2, 7 and 8, which controls discharge of foodstuff from the apparatus. In the preferred embodiment, the blocking plate means includes a blocking plate shaft 90 which extends outwardly from the housing 20 below the outlet 34, and a blocking plate 92 which is removably mounted on the plate shaft 90. The blocking plate 92 includes a second shaft opening 94 which slidably and frictionally engages the plate shaft. With reference to FIG. 1, it is seen that the plate 92 is angled downward offset from the horizontal and in alignment with the housing outlet opening 34 to provide a discharge pathway 35.

The discharge pathway 35 is defined by a channel 40 in the housing and a safety window 100 which is spaced from and overlies the feeder screw 80 and the blocking plate 92, see FIGS. 1 and 7. Safety window 100 is slidably secured to the front panel 22 of the housing 20 in opposing vertically oriented slots 38. As best illustrated in FIG. 7, employment of slidable window 100 facilitates assembly and disassembly of the apparatus.

Figure 5:
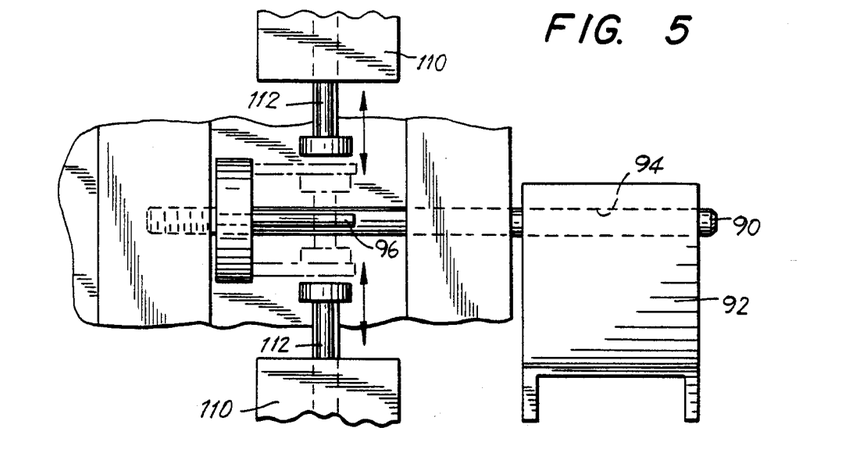
FIG. 5 is a horizontal cross-sectional view taken substantially along the line 5—5 of FIG. 2.
Figure 6:
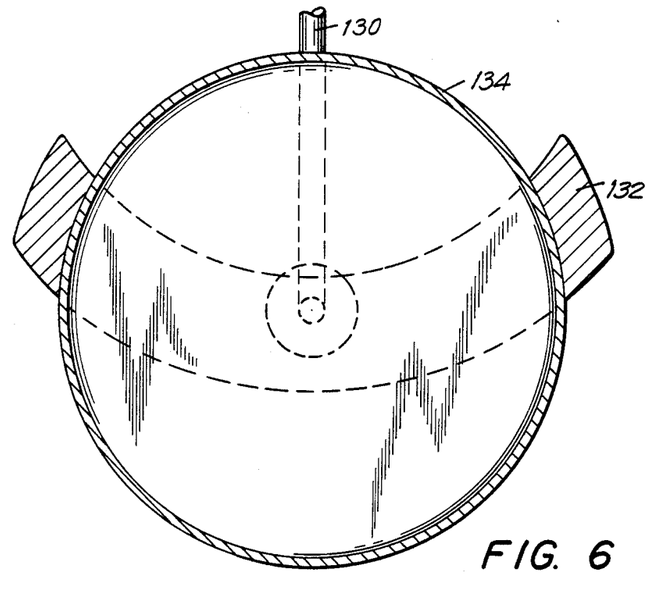
FIG. 6 is a horizontal cross-sectional view taken substantially along the line 6—6 of FIG. 1.

Vibratory motion is imparted to the blocking plate 92 by a solenoid means which effects controlled discharge of granular foodstuff from the apparatus. In a preferred solenoid arrangement, a pair of repetitively pulsed solenoids 110 which include thrusting arms 112 are disposed in opposing relation to the blocking plate shaft 90. The solenoid arms 112 reciprocate and impart vibratory motion to the blocking plate 92 by engaging a plate shaft extension member 96 which is radially offset from the plate shaft 90, see FIG. 5. Employment of the solenoid means to power the blocking plate 92 simplifies the design of the apparatus by avoiding design complexities associated with motor powered arrangements which utilize gear structures.

A self-contained electronic weighing means is incorporated within the housing to sense foodstuff discharged by the blocking plate 92. In the preferred embodiment, a capacitive transducer 120 located within the housing 20 is employed to generate an electronic weighing signal. This signal is outputted to an electronic control means which selectively actuates the feeder screw 80 and blocking plate means of the apparatus. The capacitor transducer 120 is connected by a holder arm 130 to a holder 132 which is disposed in alignment with the blocking plate 92 and discharge pathway 35. See FIG. 2. The holder 132 is adapted to support a removable dosage cup 134 which receives weight-controlled portions of foodstuff.

The weighing device 120 employs a frictionless static enigma and a pair of fixed and movable transducer plates 122, 126. The static enigma includes a fixed frame piece 124, movable frame piece 128, lower weighing spring pair 123, and upper weighing spring pair 125. The fixed plate 122 is galvanically isolated and fixed to the weighing body fixed frame piece 124. Advantageously, the parallel spring system avoids torques attributable to the distances from the static enigma at which forces originate, so that the system is not sensitive to where foodstuff is distributed in the dosage cup. The parallel weighing spring system also provides for parallel movement of the movable transducer plate 126 in relation to the fixed transducer plate 122 assuring weighing accuracy, and linear movement to the dosage cup.

Figure 9:
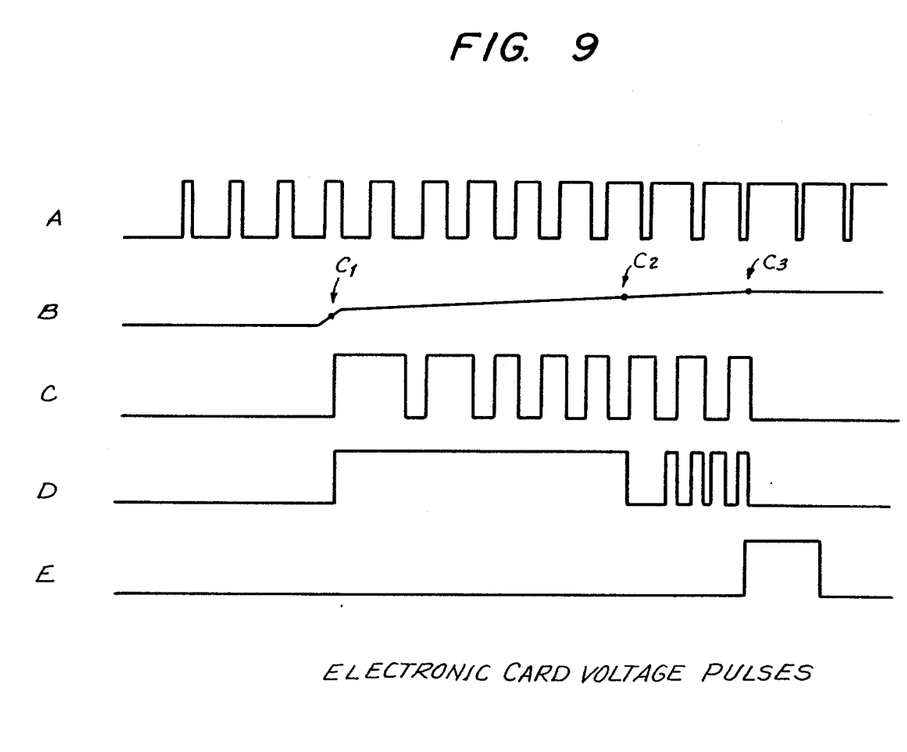
FIG. 9 schematically illustrates voltage pulses from a control card employed in the apparatus to control functioning of the feeder screw and blocking plate assembly.

The electronic control means which inputs the weighing signal, schematically illustrated in FIG. 9, includes conventional circuitry—an "electronic card"—which controls operation of the apparatus 10. The electronic card converts the electronic weighing signal received from the capacitive transducer plates 122, 126 into an analogic signal which is employed to operate three comparators, designated $C_1$, $C_2$ and $C_3$, in FIG. 9, which control operation of the apparatus. The first comparator $C_1$ senses placement of the dosage cup 134 on holder 132 for operation of the apparatus. The second comparator $C_2$ operates a fine feeding mode which is engaged when dispensed foodstuff, as measured by the electronic weighing signal, nears a preselected weighted portion. This comparator slows the food dispensing motion of the feeder screw 80 and the rate at which foodstuff is conveyed to the dosage cup 134. The third comparator $C_3$ stops the feeder screw 80 and closes the blocking plate 92 when the apparatus completes dispensing of the weight-controlled portion.

FIG. 9 illustrates voltage pulses which are representative of the functions of the electronic card. The voltage pulse designated "A" represents the signal from capacitor transducer plates 122, 126 following operation of a conventional amplifier. The "B" voltage pulse represents the converted analogic signal which controls the three comparators. Voltage pulses, C-E, respectively, represent signals to open the solenoid, engage operation of the motor M, and close the solenoid. Comparators which may be used in the preferred embodiment of the invention are commercially available from National Semiconductor Corporation, 2900 Santa Clara, Calif. 95051 under their product designation LM 324. It will be recognized by those skilled in the art that other conventional circuitries may be employed to provide control features necessary for operation of the feeder screw 80 and blocking plate 92 mechanisms.

Selector switches 140 which are of conventional design, illustrated in FIG. 1, may be positioned in the front panel of the apparatus housing 20. In the preferred embodiment, the selector switches 140 designate portions of different weights which may be dispensed into the dosage cup. A commercially available selector switch useful for this purpose is manufactured by Rafi GmbH & Co., Postfach 20 60, D-7980 Ravensburg, West Germany, under their product designation RF/314100013.

Finally, the apparatus 10 includes heat sinks 150 which are disposed on opposing sides 26 and rear panel 124 of the housing 20, and a fan 160 which circulates air within the heat sinks to enhance dissipation of heat generated during the operation of the apparatus. It will be recognized that specifications for the heat sink 150 are principally a function of the specifications for cooling element 78, the motor, a transformer, and heat generated during operation of the apparatus.

From the foregoing, it will be appreciated that the present invention provides a modular apparatus 10 for dispensing weighted portions of foodstuff which achieves the objects stated heretofore. In particular, the present invention provides an apparatus 10 having modular features including a removable silo 50 which provides access to an interior foodstuff guide and feeder pathway 32, and removable feeder screw 80 and blocking plate 92 mechanisms which further facilitate maintenance and cleaning of the apparatus. Through the coaction of the capacitive transducer 120 and an electronic control means, the invention provides accurate dispensing of weight-controlled portions of foodstuff. The electronic control means, includes comparators which provide a fine adjustment mode for the feeder screw 80, which in turn controls discharge of the foodstuff into the dosage cup 134.

Advantageously, the apparatus is of compact construction incorporating dispensing and weight measuring features in a self contained unit. Further advantage is obtained by incorporating a cooling element 78 which maintains the freshness of foodstuff during the discharge operation. Finally, pulsed solenoids 110 are employed to actuate the blocking plate 92 further simplifying the structure of the apparatus for further efficiencies in manufacture and maintenance.

Numerous modifications are possible in light of the above disclosure. For example, although a capacitor transducer is employed to perform the weighing function, other types of transducers could be employed in the apparatus. Similarly, although an arrangement of pulsed solenoids 110 have been disclosed for actuating the blocking plate 92, other means known in the art could be employed for this purpose.

It is to be understood, therefore, that the above described embodiments are merely illustrative and other embodiments may be devised by those skilled in the art, without departing from the spirit or scope of the present invention, as set forth in the appended claims.

I claim:

1. A modular apparatus for automatically dispensing weight-controlled portions of granular foodstuff, said apparatus comprising:
   (a) a housing including an opening for receiving granular foodstuff, and an outlet for dispensing the foodstuff;
   (b) a shaft mounted within said housing;
   (c) a rotable feeder screw having a first shaft opening extending therein, said feeder screw being slidably and removably received on said shaft;
   (d) blocking plate means mounted in alignment with said housing outlet for controlling discharge of the foodstuff, said blocking plate means including a blocking plate shaft, a blocking plate removably mounted on said plate shaft through a second shaft opening in said plate, and solenoid means for imparting vibratory motion to said blocking plate;
   (e) transducer means for sensing foodstuff discharged from said blocking plate means and performing a weighing function, said transducer means outputting an electronic weighing signal which is a continuous function of the weighing operation; and
   (f) electronic control means for receiving the transducer signal and actuating said feeder screw and blocking plate means to control dispensing of the foodstuff.

2. An apparatus as set forth in claim 2, wherein said blocking plate shaft includes a radially offset extension member, and said solenoid means includes a pair of repetitively pulsed solenoids, disposed in opposing relation to said extension member for imparting vibratory motion to said blocking plate.

3. A modular apparatus for automatically dispensing weight-controlled portions of granular foodstuff, said apparatus comprising:
   (a) a housing including an opening for receiving granular foodstuff, and an outlet for dispensing the foodstuff;
   (b) a shaft mounted within said housing;
   (c) a rotable feeder screw having a first shaft opening extending therein, said feeder screw being slidably and removably received on said shaft;
   (d) blocking plate means mounted in alignment with said housing outlet for controlling discharge of the foodstuff, said blocking plate means including a blocking plate shaft, a blocking plate having a second shaft opening for removable mounting of the plate on the shaft, and solenoid means for imparting vibratory motion to said blocking plate;
   (e) transducer means for sensing foodstuff discharged from said blocking plate means and performing a weighing function, said transducer means outputting an electronic weighing signal which is a continuous function of the weighing operation, said transducer means including spaced conductive plates, one of which is fixed and the other movable, said conductive plates forming a capacitor which outputs the electronic weighing signal; and
   (f) electronic control means for receiving the transducer signal and actuating said feeder screw and blocking plate means to control dispensing of the foodstuff.

4. An apparatus as set forth in claim 3, wherein said electronic control means includes a first comparator which senses operation of said transducer means and actuates the apparatus, a second comparator which provides a fine feeding mode when dispensed food, as measured by the electronic weighing signal, nears the weight controlled portion, said comparator slowing the food dispensing motion of the feeder screw, and a third comparator which closes the blocking plate and stops the feeder screw when the apparatus completes dispensing of the weight-controlled portion.

5. A modular apparatus for automatically dispensing weight-controlled portions of granular foodstuff, said apparatus comprising;
   (a) a housing including an opening for receiving the granular foodstuff, a guide for directing the foodstuff to a feeder pathway, and an outlet for discharging the foodstuff;
   (b) a silo for containing the foodstuff, said silo being removably mounted in the housing opening;
   (c) a thermal conductive shaft mounted in the feeder pathway;
   (d) cooling means mounted within the housing for cooling the shaft and foodstuff housed in the silo;
   (e) a rotable feeder screw having a first shaft opening extending therein, said feeder screw being slidably and removably received on said shaft;
   (f) blocking plate means mounted in alignment with said hinsing outlet for controlling discharge of the foodstuff;
   (g) transducer means for sensing foodstuff discharged from said blocking plate means and performing a weighing function, said transducer means outputting an electronic weighing signal which is a continuous function of the weighing operation; and
   (h) electronic control means for receiving the transducer signal and actuating said feeder screw and blocking plate means to control dispensing of the foodstuff.

6. An apparatus as set forth in claim 5, further comprising motor means for rotating said feeder screw, and wherein said feeder screw has a threaded end which screws into a gear wheel which is driven by said motor means.

7. An apparatus as set forth in claim 6, wherein the blocking plate means includes a blocking plate shaft, a blocking plate having a second shaft opening for removable mounting of the plate on the shaft, and solenoid means for imparting motion to said blocking plate, and wherein said transducer means includes spaced conductive plates, one of which is fixed and the other movable, said conductive plates forming a capacitor which outputs the electronic weighing signal.

8. An apparatus as set forth in claim 7, wherein said blocking plate shaft includes a radially offset extension member, and said solenoid means includes a pair of repetitively pulsed solenoids, disposed in opposing relation to said extension member for imparting vibratory motion to said blocking plate, 9. An apparatus as set forth in claim 7, wherein said electronic control means includes a first comparator which senses operation of said transducer means and actuates the apparatus, a second comparator which provides a fine feeding mode when dispensed food, as measured by the electronic weighing signal, nears the weight controlled portion, said comparator slowing the food dispensing motion of the feeder screw, and a third comparator which closes the blocking plate and stops the feeder screw when the apparatus completes dispensing of the weight-controlled portion.

10. An apparatus as set forth in claim 9, further comprising a dose cup holder which is connected to said capacitor transducer, said holder being disposed in alignment with the outlet of the apparatus for receiving the weighted foodstuff discharge, said holder moving the fixed conductive plate of the capacitor transducer when the foodstuff is discharged thereon.

11. An apparatus as set forth in claim 9, wherein said dose cup holder is adapted to support a removable dose cup.

* * * * *